(12) United States Patent
Meraldi et al.

(10) Patent No.: US 8,585,947 B2
(45) Date of Patent: *Nov. 19, 2013

(54) PROCESS FOR MANUFACTURING A COMPOSITE RING

(75) Inventors: Jean-Paul Meraldi, Zurich (CH); Antonio Delfino, Grolley (CH)

(73) Assignee: Michelin Recherche et Technique S.A., Granges-Paccot (CH)

( * ) Notice: Subject to any disclaimer, the term of this patent is extended or adjusted under 35 U.S.C. 154(b) by 601 days.

This patent is subject to a terminal disclaimer.

(21) Appl. No.: 12/223,341

(22) PCT Filed: Jan. 23, 2007

(86) PCT No.: PCT/EP2007/000541
§ 371 (c)(1),
(2), (4) Date: Jul. 28, 2008

(87) PCT Pub. No.: WO2007/085414
PCT Pub. Date: Aug. 2, 2007

(65) Prior Publication Data
US 2009/0022921 A1  Jan. 22, 2009

(30) Foreign Application Priority Data
Jan. 27, 2006 (FR) ..................... 06 00892

(51) Int. Cl.
*B29C 67/00* (2006.01)

(52) U.S. Cl.
USPC ........ 264/137; 264/45.1; 264/45.8; 264/46.9; 264/632; 264/635; 264/640; 264/641; 264/642; 264/643; 264/501; 264/510; 264/511; 264/512; 264/518; 264/544; 264/545; 264/563; 264/171.1; 264/171.17; 264/171.2; 264/136; 264/135; 264/134; 264/171.26; 264/172.19; 264/173.1; 264/209.1; 264/209.2; 264/241; 264/258; 264/326

(58) Field of Classification Search
USPC ........ 264/460–463, 471, 479, 480, 492–495, 264/102, 136, 137, 241, 258, 1.28, 638, 264/639, 45.1, 45.8, 46.9, 632, 635, 264/640–643, 501, 510–512, 518, 544, 545, 264/563, 171.1, 171.17, 171.2, 135, 134, 264/171.26, 172.19, 173.1, 209.1, 209.2, 264/326; 156/110.1, 117, 394.1, 397, 396, 156/422

See application file for complete search history.

(56) References Cited

U.S. PATENT DOCUMENTS

| 4,445,957 A | 5/1984 | Harvey et al. |
| 5,428,896 A * | 7/1995 | Auberon et al. ........... 29/888.09 |

(Continued)

FOREIGN PATENT DOCUMENTS

| EP | 1 074 369 | 7/2000 |
| EP | 1 167 080 | 1/2002 |

(Continued)

OTHER PUBLICATIONS

W.J. Humphlett, "4-Thiazoline-2-thiones. V. Kinetic vs. Thermodynamic Control of the Conjugate Addition at the *S*- vs. *N*-Positions to Acrylonitrile and Methyl Acrylate", XP-002389017, pp. 387-391, Jun. 1968.

*Primary Examiner* — Jeffrey Wollschlager
*Assistant Examiner* — Stella Yi
(74) *Attorney, Agent, or Firm* — Cozen O'Connor

(57) ABSTRACT

A process for manufacturing a composite block of closed geometry, in the form of a continuous ring, based on fibers and on a crosslinkable resin, by continuous winding and superposition of several layers of a tape of reinforcement fibers embedded in a matrix based on a composition comprising a crosslinkable resin. The process comprises from upstream to downstream, the following steps: producing a rectilinear arrangement (12) of reinforcement fibers (11) and conveying this arrangement in a feed direction (F); degassing the arrangement (12) of fibers by the action of a vacuum (13); after degassing, impregnating said arrangement (12) of fibers under vacuum with said resin composition in the liquid state (17); passing the pre-preg thus obtained through a die (20) to make said pre-preg into the form of a tape (21) composed of reinforcement fibers (11) in their liquid resin (17) matrix, the thickness of said tape being less than 0.5 mm; depositing the tape (21) onto a support (23) dictating the final shape of the composite block and winding said tape (21) around said support (23), unidirectionally, by superposition of a predetermined number Nc of layers of said tape (21) in order to directly form said continuous ring on said support, Nc being less than 15; and once the continuous ring has thus been formed, subjecting the liquid resin to an at least partial polymerization (25) in order to stabilize said ring before removing it from its support (23).

14 Claims, 3 Drawing Sheets

(56) References Cited

U.S. PATENT DOCUMENTS

| | | | |
|---|---|---|---|
| 5,779,838 A | 7/1998 | Fellers et al. | |
| 6,436,215 B1 | 8/2002 | Spragg et al. | |
| 6,640,859 B1 | 11/2003 | Laurent et al. | |
| 6,875,297 B1 | 4/2005 | Meuwly et al. | |
| 6,994,135 B2 | 2/2006 | Delfino et al. | |
| 2002/0003004 A1* | 1/2002 | Guckert et al. | 138/137 |
| 2003/0015827 A1* | 1/2003 | Hinc et al. | 264/479 |
| 2006/0047050 A1 | 3/2006 | Chenaux et al. | |

FOREIGN PATENT DOCUMENTS

| | | |
|---|---|---|
| EP | 1 174 250 | 1/2002 |
| EP | 1 359 028 | 4/2003 |
| FR | 2 787 388 | 6/2000 |
| FR | 2 875 437 | 3/2006 |
| JP | 52 117966 | 10/1977 |
| WO | WO 00/37269 | 6/2000 |
| WO | WO 2004/058909 | 7/2004 |

* cited by examiner

US 8,585,947 B2

PROCESS FOR MANUFACTURING A COMPOSITE RING

RELATED APPLICATIONS

This is a U.S. National Phase Application under 35 USC 371 of International Application PCT/EP2007/000541, filed on Jan. 23, 2007

This application claims the priority of French patent application no. 06/00892 filed Jan. 27, 2006, the subject matter of which is hereby incorporated by reference.

FIELD OF THE INVENTION

The present invention relates to composite materials based on fibres and on a curable resin, to the composite parts manufactured from such materials and also to the processes and devices for manufacturing such composite materials or parts.

BACKGROUND OF THE INVENTION

Patent Application EP-A-1 074 369 (or U.S. Pat. No. 6,875,297) described a process for manufacturing a composite part of given thickness, of convex shape comprising reinforcement fibres parallel to at least one preferred direction of reinforcement, said fibres being embedded in a matrix based on a composition comprising a resin that can be cured by ionizing radiation, the process comprising the following steps:

arranging said reinforcement fibres substantially parallel to one plane and impregnating them with said composition in the liquid state;

exposing the composition containing said fibres, in a layer of thickness less than said given thickness, to ionizing radiation in order to partially polymerize the resin and obtain a precomposite in which said composition is in the solid phase;

removing individual sections from the solid precomposite thus obtained and applying them to a support, the surface of which is non-planar in shape, by stacking them on one another in a number dictated by said given thickness, and by making them closely fit said shape of the support and thus create a stack of stressed individual sections; and finally subjecting the stack thus obtained to a final moulding, at high pressure and temperature, in order to continue the polymerization of the resin and to thus join the various precomposite sections together.

Due to the process described, it is possible to obtain composite parts that can be used, in particular, for manufacturing non-pneumatic tires for a motor vehicle.

However, one drawback of this process is that it is necessary, after solidifying the resin-based matrix, to first cut the solid precomposite into individual sections, then to superpose, in the final desired shape, the stressed individual sections; so many successive handling operations are penalizing from an industrial viewpoint and are in contradiction with the pursuit of high production rates.

Patent Application EP-A-1 174 250 (or U.S. Pat. No. 6,926,853) proposed:

degassing the arrangement of fibres before impregnating it;

after degassing then impregnating under vacuum, passing the liquid pre-preg through a sizing die having a cross section of predetermined area and shape, to provide said pre-preg with a predetermined shape such as, for example, that of a thread with a round cross section (see, for example, FIG. 1 to 3) or more particularly a tape shape (FIG. 4 to 7);

then, downstream of the die, stabilizing said thread or tape by substantial solidification of the resin in a chamber known as a stabilization chamber comprising a series of irradiation tubes (referenced, for example, 131 and 231 respectively in FIGS. 1 and 4) that emit in the UV/visible range; and finally winding said solid (stabilized) thread or tape onto a large-diameter receiving reel (referenced, for example, 141 in FIG. 1), for intermediate storage.

It is then possible to prepare composite parts by unwinding then rewinding of solid layers of said thread or tape, around any support of suitable shape.

However, when the preceding drawbacks of sectioning and assembling prestressed sections are thus removed, it still remains in fine a curing operation in a mould under a very high pressure, without which it is impossible to attach said individual sections together and consequently obtain composite parts that have a high fatigue strength, in particular a high shear strength especially illustrated by very high "ILSS" (Inter Laminar Shear Strength) values.

However, the curing operation in a mould under a high pressure has, in a known manner, its own drawbacks among which are a high mould cost, the need for control of the sealing and for a homogeneous pressure distribution, which are responsible for a high final industrial cost. By way of example, in order to have a uniform curing pressure at very high pressures of around 50 bar, it is necessary to use flexible curing membranes, the lifetime of which proves limited.

SUMMARY OF THE INVENTION

The inventors have discovered a novel process which makes it possible to prepare a composite part of very high quality, in the form of a continuous ring, while overcoming the major aforementioned drawbacks, that is to say by eliminating, on the one hand, the operations of sectioning then reassembling via superposition and by avoiding, on the other hand, curing in a mould at high pressure.

Consequently, one aspect of the present invention is directed to a process for manufacturing a composite block of closed geometry, in the form of a continuous ring, based on fibres and on a crosslinkable resin, by continuous winding and superposition of several layers of a tape of reinforcement fibres embedded in a matrix based on a composition comprising a crosslinkable resin, said process comprising, from upstream to downstream, the following steps:

producing a rectilinear arrangement of reinforcement fibres and conveying this arrangement in a feed direction;

degassing the arrangement of fibres by the action of a vacuum;

after degassing, impregnating said arrangement of fibres under vacuum with said resin composition in the liquid state;

passing the pre-preg thus obtained through a die to make said pre-preg into the form of a tape composed of reinforcement fibres in their liquid resin matrix, the thickness of said tape being less than 0.5 mm;

depositing the tape onto a support dictating the final shape of the composite block and winding said tape around said support, unidirectionally, by superposition of a predetermined number, denoted by "Nc", of layers of said tape in order to directly form said continuous ring on said support, Nc being less than 15; and once the continuous ring has thus been formed, subjecting its liquid resin to an at least partial polymerization in order to stabilize said ring before removing it from its support.

A major advantage of such a process is that it allows the pure and simple removal of the stabilization chamber and its series of UV irradiation tubes as described in Application EP-A-1 174 250 above, which significantly simplifies the manufacturing process and device, at the same time substantially reducing the final industrial cost of the intended composite blocks.

Another aspect of the invention is directed to a device capable of implementing the herein described process according to the invention, such a device comprising at least, from upstream to downstream (with reference to FIGS. 1 and 2):

means (10) for the rectilinear arrangement of the reinforcement fibres (11) and means (23) of conveying said arrangement (12) in a feed direction (F);
a vacuum chamber (13, 13a, 13b);
on exiting the vacuum chamber, an impregnation chamber (14, 15, 16, 17, 18) intended for impregnating the fibres (11, 12) with the liquid-state resin composition (17);
sizing means (19, 20) comprising at least one sizing die (20), for forming a tape (21) comprising the fibres (11) and the liquid-state resin (17);
a support or mandrel (23) of closed shape intended for receiving said tape (21) in order to form, by superposition of layers of said tape, a composite ring (30) on said support; and
a support or mandrel, arranged opposite which are polymerization means (25) capable of polymerizing, at least partially, the resin of said composite ring on said support or mandrel (23) once the ring (30) has been formed.

Another aspect of the invention is directed to a continuous composite ring of monolithic structure comprising unidirectional reinforcement fibres embedded in a matrix based on a crosslinkable resin, obtainable by the herein described process of the invention.

DETAILED DESCRIPTION OF THE DRAWINGS

Figure 1:
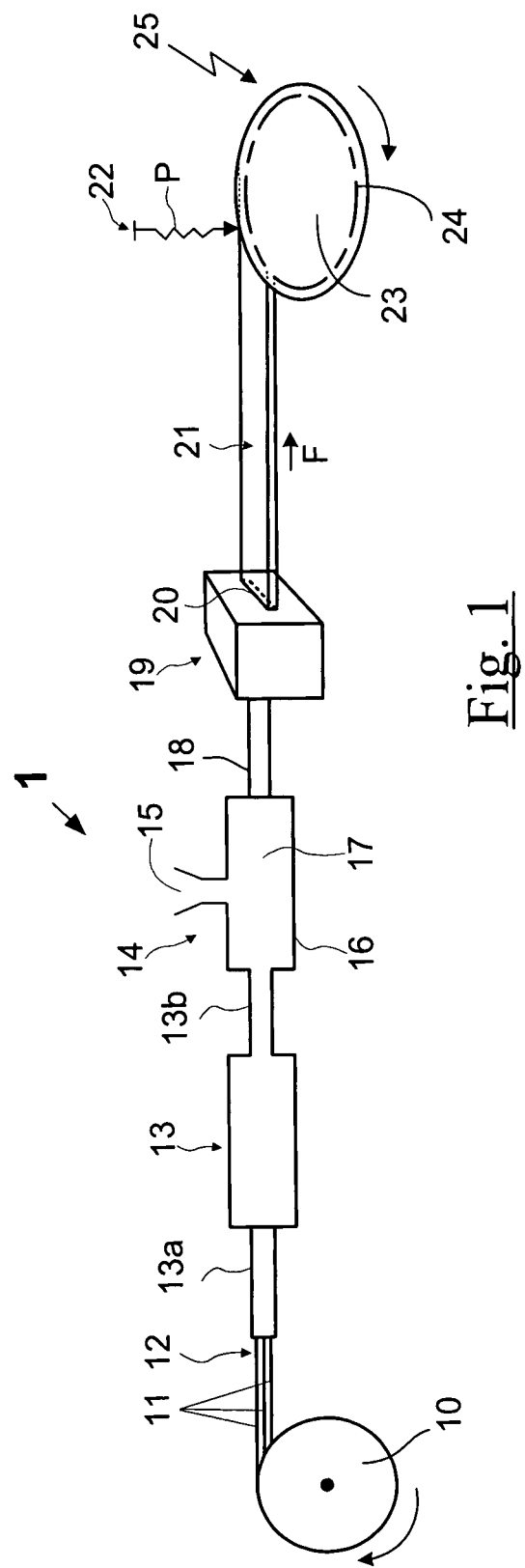
FIG. 1 is a schematic diagram of an embodiment of a device for implementing a process involving an aspect of the invention.

In the present description, except where expressly indicated otherwise, all the percentages (%) indicated are % by weight.

The first three steps (arrangement, degassing and impregnation) of the process of the invention are steps known to a person skilled in the art, as are the materials (fibres and resin compositions) used; they have, for example, been described in one and/or the other of the two aforementioned Applications EP-A-1 074 369 and EP-A-1 174 250.

Any type of reinforcement fibre can be used as long as the latter is compatible with its crosslinkable resin matrix. Such a fibre is, for example, chosen from the group composed of polyacrylic fibres, polyacrylonitrile fibres, polyvinyl alcohol fibres, aromatic polyamide (or "aramid") fibres, polyamide-imide fibres, polyimide fibres, chlorofibres, polyester fibres, aromatic polyester fibres, polyethylene fibres, polypropylene fibres, cellulose fibres, rayon fibres, viscose fibres, polyphenylene benzobisoxazole (or "PBO") fibres, polyethylene naphthenate ("PEN") fibres, glass fibres, carbon fibres, silica fibres, ceramic fibres and mixtures of such fibres. It is preferred to use high-tenacity fibres, particularly fibres chosen from the group composed of glass fibres, carbon fibres and mixtures of such fibres.

Before any impregnation of the fibres, an essential step of degassing the arrangement of fibres by the action of a vacuum must be carried out in order, in particular, to improve the impregnation efficiency and especially to guarantee the absence of bubbles inside the final composite ring. Such a degassing step has been described in detail in the aforementioned Application EP-A-1 174 250.

The resin composition used is, for example, a resin that can be crosslinked (i.e. that can be cured) by ionizing radiation such as, for example, ultraviolet/visible radiation emitting, preferably in the spectrum ranging at least from 300 nm to 450 nm, an accelerated electron beam or an X-ray beam. It is also possible to choose a composition comprising a resin that can be cured by a peroxide, the subsequent crosslinking possibly then being carried out, when the time comes, by means of a supply of heat, for example by microwave action. Preferably, a composition of the type that can be cured by ionizing radiation is used, the final polymerization possibly being activated and controlled easily by means of an ionizing treatment, for example of the UV or UV/visible type.

By way of crosslinkable resin, a polyester or vinyl ester resin is preferably used. The term "polyester" resin is understood, in a know manner, to mean a resin of the unsaturated polyester type. The vinyl ester resins are themselves well known in the field of composite materials.

Without this definition being limiting, the vinyl ester resin is preferably of the epoxy vinyl ester type. More preferably, a vinyl ester resin, especially of epoxide type, is used which, at least in part, is based on (that is to say grafted to a structure of the type) novolac (also known as phenoplast) and/or bisphenol, or preferably a vinyl ester resin based on novolac, bisphenol, or novolac and bisphenol.

A novolac-based (part between brackets in the formula I below) epoxy vinyl ester resin corresponds for example, in a known manner, to the formula (I) below:

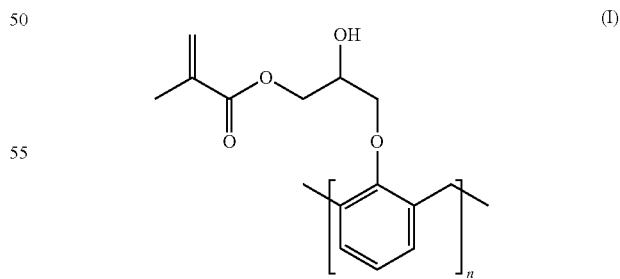

A bisphenol A-based (part between brackets in the formula (II) below) epoxy vinyl ester resin corresponds, for example, to the formula (the "A" recalling that the product is manufactured using acetone):

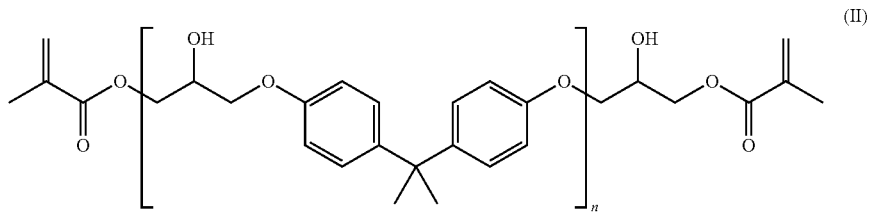

An epoxy vinyl ester resin of novolac and bisphenol type has shown excellent results. As an example of such a resin, mention may especially be made of the vinyl ester resin "ATLAC 590" from DSM (diluted with around 40% stirene) described in the aforementioned Applications EP-A-1 074 369 and EP-A-1 174 250. Such epoxy vinyl ester resins are available from other manufacturers such as Reichhold, Cray Valley or UCB.

The die known as a "sizing die" makes it possible, due to a cross section of given dimensions, generally and preferably rectangular, to adjust the amount of resin relative to the reinforcement fibres while providing the pre-preg with the shape and thickness desired for the tape.

The tape of fibres thus formed through the sizing die then arrives, continuously, onto a support or mandrel of suitable shape around which it is then directly wound, unidirectionally, by superposition of the predetermined number of layers Nc. Thus a continuous and closed ring is formed whose cross section is essentially rectangular, this being carried out, remember, before any stabilization or even partial polymerization of the resin.

According to one preferred embodiment, the tensile stress experienced by the reinforcement fibres in the tape while running (that is to say by the impregnated fibres) is between 0.2 and 5 cN/tex (centiNewton per tex); this is therefore the stress measured between the sizing die and the inlet of the support or mandrel that dictates the shape of the final composite block. It has been observed that outside of this preferred stress range, there was a risk of deformation of the tape, or at the very least of loss of regularity of the shape thereof, which may be damaging to the quality and fatigue strength of the final composite block. For this reason, said tensile stress is more preferably between 0.5 and 2.5 cN/tex.

The operation for winding the tape onto said mandrel is preferably carried out by rotation of the mandrel itself in a fixed plane that is tangential to the plane in which the tape arrives at the rotating mandrel. The winding operation is stopped once the Nc layers of tape are wound on top of themselves.

According to one possible embodiment variant, each layer of order N may be pressed mechanically at the entry to the support or mandrel, for example by rollering using a roller having the same width as the tape, so as to lightly compact the assembly, guarantee an excellent adhesion between the successive layers and distribute the fibres laterally in a homogeneous manner.

One notable advantage of the process of the invention, due to the absence of solidification, even partial, of the resin during the entire winding operation is that the tape retains a satisfactory tackiness to enable the adhesion, onto the layer of order N, of the following layer (N+1) without it being necessary to exert any additional mechanical and/or thermal action.

At this stage a composite block is obtained that is in the form of a continuous flat ring that is monolithic in the sense that no individual layer or stratum is visible in cross section, the reinforcement fibres of which are substantially unidirectional, are distributed homogeneously throughout the volume and are in a matrix (i.e. resin composition) that is still in the liquid state.

The particular geometry of the ring thus formed, preferably convex (for example, circular, oval or elliptical) is of course dictated by that of the support or mandrel on which the "liquid" tape has been wound. According to one preferred embodiment variant, the support or mandrel, for example made of metal, is equipped with a flat-bottomed receiving groove that fits the shape of the tape, and has a suitable depth to geometrically receive and stabilize the Nc superposed layers of tape.

Once the "liquid" composite ring has thus been formed, the liquid resin is subjected to an at least partial polymerization, for example using UV radiation or a heat treatment, to stabilize and solidify, at least in part, said ring before separating it from its support. To facilitate this separation, said support is advantageously constructed from two symmetrical or unsymmetrical removable parts which may easily be separated mechanically.

The composite block thus stabilized, in which the resin composition is then, at least partly, in the solid phase, may then be easily handled, stored as is or treated immediately in order to finish polymerizing the resin (final curing or crosslinking).

The final curing operation may be carried out under simple atmospheric pressure, "out of mould" (or in "open mould" according to recognized terminology), by any means known to a person skilled in the art. Use is made, for example, of a simple thermal oven at the appropriate temperature, under atmospheric pressure or under a low pressure, or else of a UV chamber. One possible embodiment variant consists in completely curing the composite block on its receiving support or mandrel, and in only extracting the latter after completely curing.

The thickness of the final composite ring is preferably between 0.5 and 5.0 mm (millimeters), more preferably in a range of 1 to 2 mm. Its width is preferably less than 25 mm, more preferably in a range of 5 to 20 mm.

As regards the dimensions of the ring itself (i.e., substantially that of the mandrel or support that has been used for its manufacture), its largest dimension (for example its diameter if the ring is of circular geometry) is typically of the order of a few cm (centimeters) to a few tens of cm.

Two essential characteristics of the process of the invention are, on the one hand, the maximum thickness of the tape exiting the sizing die, which must be less than 0.5 mm, and, on the other hand, the maximum number of layers which are would round to form the composite ring, which must be less than 15. It has emerged that if these two characteristics are not verified, the shape and the regularity of the tape, like those of the final composite, are no longer under control, which leads to a damaging degradation of the flexural/compressive strength of the final composite ring. Furthermore, a thickness of less than 0.05 mm (i.e. 50 µm) may not be readily compatible with industrial constraints.

For all the reasons indicated above, the thickness of the tape exiting the die is preferably chosen between 0.05 and 0.35 mm, more preferably between 0.10 and 0.30 mm; the number of layers Nc is itself preferably less than 10, more preferably between 5 and 10.

A person skilled in the art expected that air bubbles are inevitably formed at the surface of the tape, at the outlet of the sizing die, due to the overpressure imposed (end of the vacuum zone), and that these bubbles are then easily trapped between the layers of tape due to the winding technique adopted here, in this case a unidirectional winding via superposition of layers (without overlapping winding, fibres not crossed), what is more in the absence of notable tension on the fibres. Such a parasitic effect would naturally impair the quality and the appearance of the final composition and also its toughness.

Unexpectedly, it is nothing of the sort, on condition of respecting all the combined technical characteristics of the process of the invention, in particular the two essential conditions mentioned above relating to the thickness of the elementary tape and to the number of superposed layers.

Of course, the present invention covers the cases where one or more steps other than the steps described above (arrangement of the fibres, degassing, impregnation, sizing, unidirectional winding on a support, at least partial stabilization) are added to the process of the invention.

The process of the invention may be carried out using a device (1) itself a subject of the invention comprising at least, from upstream to downstream (with reference to FIGS. 1 and 2):

means (10) for the rectilinear arrangement of the reinforcement fibres (11) and means (23) of conveying said arrangement (12) in a feed direction (F);
a vacuum chamber (13, 13*a*, 13*b*);
on exiting the vacuum chamber, an impregnation chamber (14, 15, 16, 17, 18) intended for impregnating the fibres (11, 12) with the liquid-state resin composition (17);
sizing means (19, 20) comprising at least one sizing die (20), for forming a tape (21) comprising the fibres (11) and the liquid-state resin (17);
a support or mandrel (23) of closed, preferably convex, shape intended for receiving said tape (21) in order to form, by superposition of layers of said tape, a composite ring (30) on said support; and
a support or mandrel, arranged opposite which are polymerization means (25) capable of polymerizing, at least partially, the resin of said composite ring on said support or mandrel (23) once the ring (30) has been formed.

The appended FIG. 1 very simply illustrates an example of such a device 1 (partly in perspective in order to illustrate the emergence of the tape 21 after passing through the sizing means 19, 20).

A reel 10 is seen therein that contains, in the example illustrated, glass fibres 11. The reel is continuously unwound by entrainment, so as to produce a rectilinear arrangement 12 of these fibres 11. Generally, the reinforcement fibres are delivered as "rovings", that is to say already in groups of fibres wound in parallel on a reel (for example, use is made of the fibres sold by Owens Corning under the fibre name "Advantex", having a linear density equal to 1200 tex (as a reminder, 1 tex=1 g/1000 m of fibre)). It is, for example, the tension exerted by the rotating receiver 23 which enables the parallel fibres and the tape to be fed along the installation 1.

This arrangement 12 then passes through a vacuum chamber 13 (connected to a vacuum pump that is not shown), positioned between an inlet tubing 13*a* and an outlet tubing 13*b* that leads to the impregnation chamber 14, the two preferably rigid-walled tubings having, for example, a minimum cross section greater (typically two times more) than the total cross section of the fibres and a length much greater (typically 50 times more) than said minimum cross section.

As already taught by the aforementioned Application EP-A-1 174 250, the use of rigid-walled tubings, both for the inlet orifice into the vacuum chamber and for the outlet orifice from the vacuum chamber and the transfer from the vacuum chamber to the impregnation chamber, proves to be compatible with the high rates at which the fibres pass through the orifices without fibre breakage, and also makes it possible to ensure a sufficient sealing. It is sufficient, if experimentally necessary, to seek the largest passage cross section, taking into account the total cross section of the fibres to be treated, that still makes it possible to offer a sufficient sealing, taking into account the feed rate of the fibres and the length of the tubings. Typically, the vacuum inside the chamber 13 is, for example, around 0.1 bar.

On exiting the vacuum chamber 13, the arrangement 12 of fibres 11 passes into an impregnation chamber 14 that comprises a feed tank 15 (connected to a metering pump, not shown) and an impermeable impregnation tank 16 completely filled with the impregnation composition 17 based on a curable resin of the vinyl ester type (e.g., ATLAC 590 from DSM). By way of example, the composition additionally comprises (in an amount of 1 to 2 wt %) a photoinitiator suitable for the UV and/or UV/visible radiation with which the composition will subsequently be treated, for example bis(2,4,6-trimethylbenzoyl)-phenylphosphine oxide (IRGA-CURE 819 from Ciba). Of course, the impregnation composition 17 is in the liquid state. Thus, a pre-preg which comprises, for example, from 50 to 75% (% by weight) of solid fibres 11, the remainder being made up of the liquid impregnation matrix 17, emerges from the impregnation chamber 14 into an impermeable outlet tubing 18 (still under vacuum).

The pre-preg then passes through sizing means 19 that comprise at least one sizing die 20 of which the channel (not shown here), for example of rectangular or conical shape, is suitable for the particular production conditions. By way of example, this channel has a minimum cross section of rectangular shape of which the downstream orifice has dimensions (for example 5.3 mm by 0.25 mm or 10.6 mm by 0.25 mm) slightly greater than that of the planned tape. Said die has a length which is typically at least 100 times greater than the minimum dimension of the minimum cross section. It has the role of ensuring a great dimensional precision to the finished product; it may also have the role of metering the fibre content relative to the resin. According to one possible embodiment variant, the die 20 may be directly integrated into the impregnation chamber 14, which avoids, for example, the use of the outlet tubing 18.

Owing to the sizing means (19, 20) a "liquid" composite tape 21 (liquid in the sense that its impregnation resin is still liquid) is obtained at this stage, for which the shape of the cross section is mainly rectangular (for example, 5 mm by 0.2 mm or 10 mm by 0.2 mm, respectively).

Between the sizing means (19, 20) and the final receiving support (23), it is preferred to keep the tensions experienced by the fibres at a moderate level, for example between 0.5 and 2.5 cN/tex; in order to control this, it will be possible, for example, to measure these tensions directly at the outlet of the die, using suitable tensiometers well known to a person skilled in the art.

The tape 21, entrained in the direction of the arrow F, then arrives into its final receiving support 23, for example a rotating mandrel of convex shape (here oval, by way of example), at the inlet to which it may, according to one advantageous embodiment, be pressed mechanically using means 22 (for example, by mechanical rollering using a roller) that exerts a slight pressure P on the upper surface of the tape 21. The rotating mandrel 23 is preferably equipped with a receiving groove 24 that matches the shape and width of the tape 21 and that thus facilitates the winding of the tape around itself in its various superposed layers Nc.

Once the Nc layers of tape have been wound, the winding is stopped. The "liquid" composite block thus obtained is partially polymerized owing to the polymerization means 25 arranged opposite the mandrel 23 (for example, a few seconds under UV radiation), directly on said mandrel, before extracting the latter mechanically (separation into two parts).

The tape thus stabilized may be easily handled; it is, for example, treated for 5 min in a UV oven (UVAprint lamp from Dr. Hönle, having a wavelength of 200 to 600 nm) before final curing in a simple oven, for example under atmospheric pressure and high temperature (for example at 230° C. for 5 to 6 min) if a high $T_g$ (glass transition temperature) value is desired for the final composite. According to another embodiment variant, the whole curing operation could be carried out under UV radiation, entirely or not on the receiving mandrel.

Finally, a composite block is obtained in the form of a continuous closed ring whose reinforcement fibres are distributed homogeneously throughout the volume.

In comparison to the composite blocks or rings of the prior art prepared according to the teaching of the aforementioned Patent Applications EP-A-1 074 369 or EP-A-1 174 250, this composite ring is novel in the sense that it has a veritable monolithic structure; this is understood to mean a homogeneous structure, that is to say in which no stratum (or elementary layer of tape) is visible in cross section, in particular when said cross section is observed under an optical microscope, and no stratum can be revealed during use. It is equipped with excellent mechanical properties, with, in particular, a very high flexural and shear endurance, at least as good as, if not better than, that observed on these composite rings of the prior art that require a very high pressure during their final curing.

Figure 2:
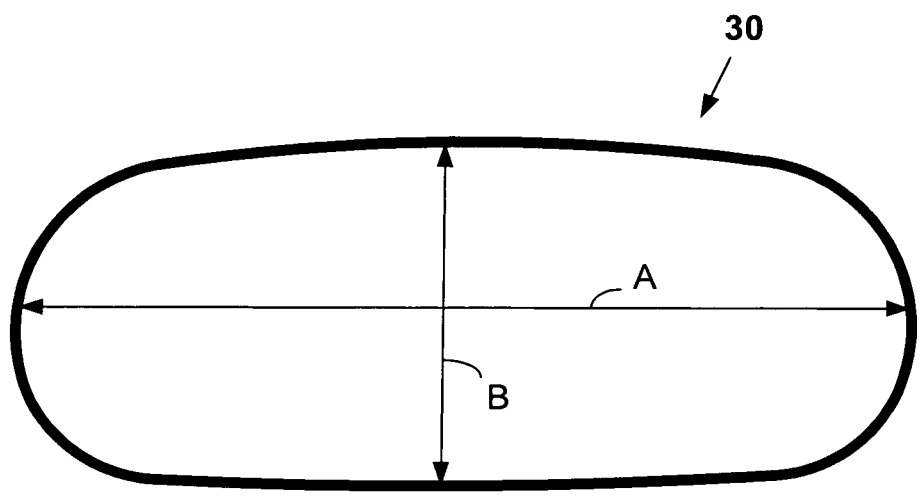
FIG. 2 shows a composite block (continuous individual ring) obtainable with the disclosed process.

Such an example of a composite block 30 has been reproduced schematically in the appended FIG. 2; it was obtained by winding over a convex mandrel of elliptical shape. It consists of a continuous flat closed ring 30 whose rectangular cross section has dimensions of 10 mm by 1.4 mm. As can be seen in FIG. 2, the shape or geometry of the ring is mainly elliptical with longitudinal internal dimensions (denoted by A in FIG. 2) of around 15 cm and transverse internal dimensions (denoted by B in FIG. 2) of around 6 cm. Such a composite ring or block was prepared by winding 7 (Nc=7) successive layers of tape, in accordance with the process of the invention described previously, using a device such as is shown schematically in FIG. 1.

The invention thus offers the possibility of manufacturing a composite block in very small cross sections which may have a very large number of industrial applications, whether it is used individually or combined with other composite blocks to form more complex structures. Such structures could be used, in particular, as reinforcement for any motor vehicle ground-contact system, such as a non-pneumatic tire, a pneumatic tire, an internal safety support for a tire, a wheel, another suspension and anti-vibratory element.

By way of example, by adapting the number "Na" (Na preferably less than 10, for example in 5 a range of 3 to 7) and the dimensions of these elementary rings, the latter may advantageously be housed within one another, then mechanically or "chemically" clamped due, for example, to the use of a filling polymer intended for filling in all the interstices present between the elementary rings. This filling polymer must of course be compatible with the resin of the composite ring and capable of achieving a good adhesion with the latter, if necessary by means of a suitable adhesive composition such as described, for example, in Application WO 2004/058909 (or US 2006/0047050). This polymer is, for example, a diene elastomer or a polyurethane.

Figure 3:
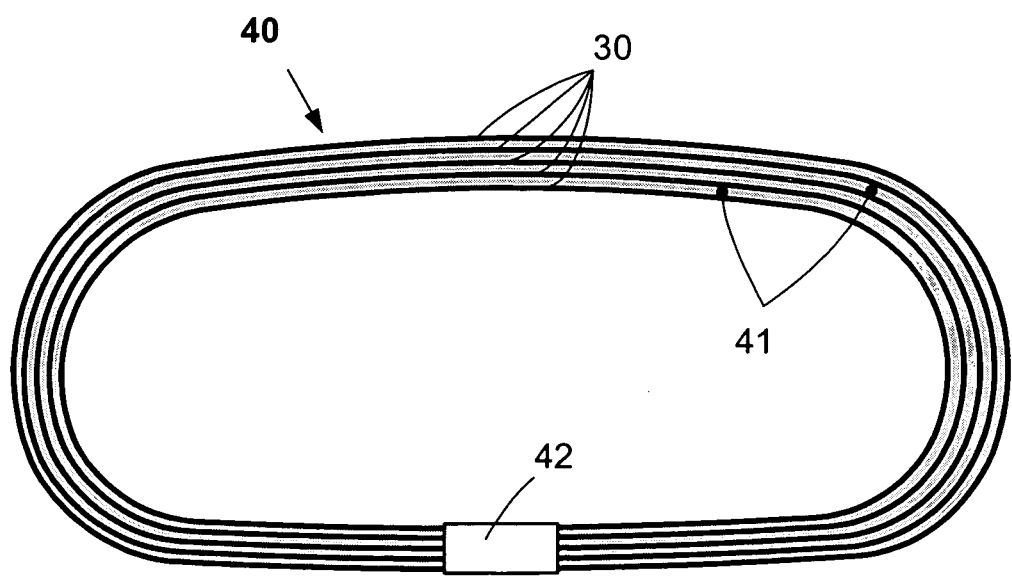
FIG. 3 shows an assembly of several blocks.

Shown schematically in FIG. 3 is an example of such a composite reinforcement 40 formed from 5 (Na=5) elementary rings 30 which are "chemically" joined together due to the use of a filling polymer 41 (for example made of polyurethane or diene rubber) that fills in the interstices present between the 5 elementary rings 30. The reinforcement 40 may comprise mechanical bonding means 42 (for example, a clamp) intended to provide the subsequent bonding to the rigid part of a wheel as explained below.

This composite reinforcement may form a radial reinforcing arch of a non-pneumatic tire carcass such as described, for example, in Patents or Patent Applications WO 00/37269 (or U.S. Pat. No. 6,640,859) and EP 1 359 028 (or U.S. Pat. No. 6,994,135).

Figure 4:
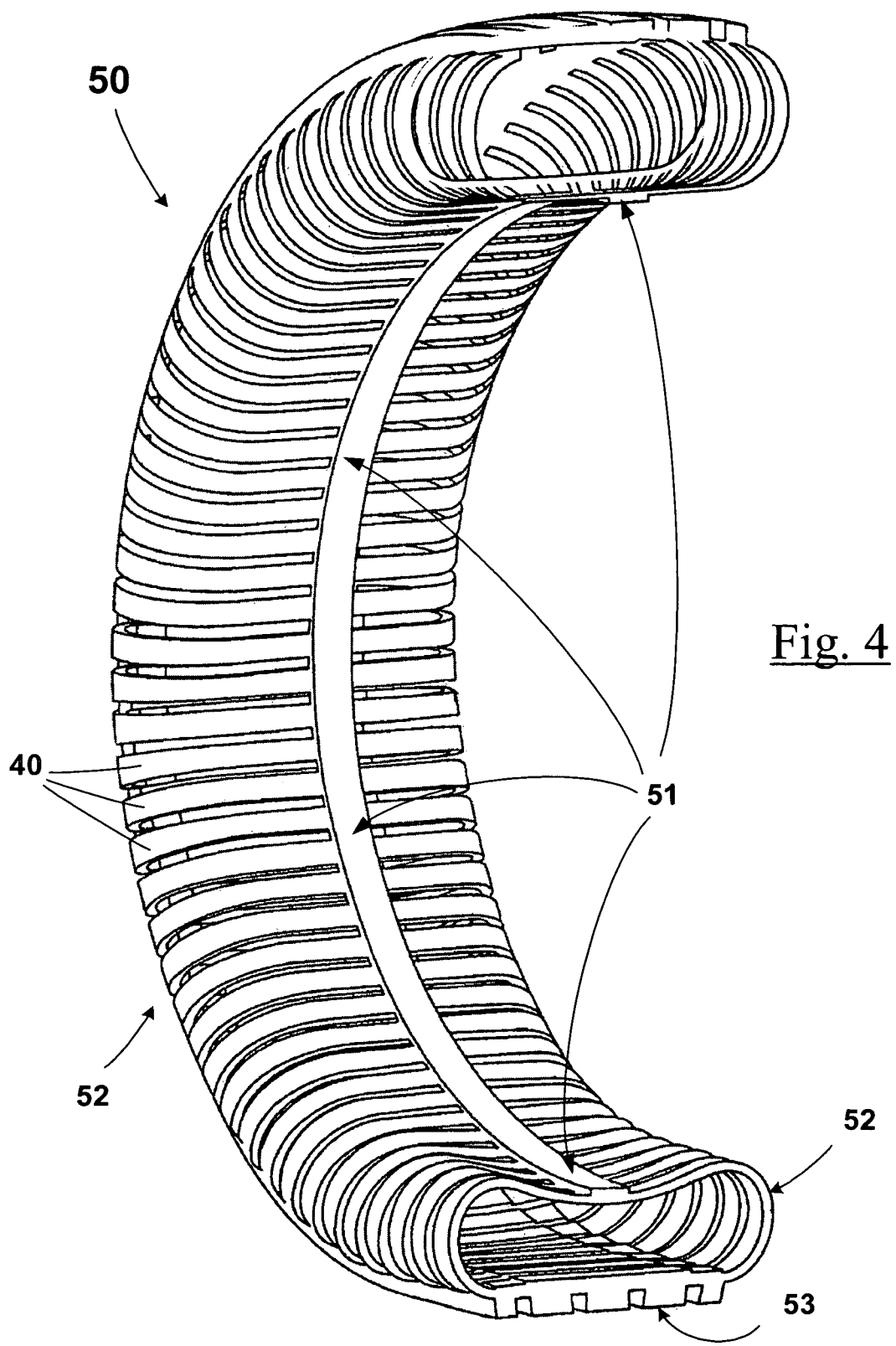
FIG. 4 shows a non-pneumatic rubber tire for which the assembly of blocks constitutes a reinforcement structure.

The appended FIG. 4 shows a partial perspective of such a flexible non-pneumatic tire 50. Such a tire, when it is combined with any other rigid mechanical element intended for providing the bonding between the flexible tire and the hub, replaces the assembly made up of the tire and the wheel such as are known for most current road vehicles.

The profile of the tire delimits a toric internal cavity of ovoidal cross section. The tire 50 comprises an attachment zone 51 (comprising the bonding means 42 illustrated in FIG. 3), two sidewalls 52 and a tread 53. The attachment zone is intended to be rigidly bonded to a wheel hub via a mechanical element such as a wheel disc (not shown here). In this FIG. 4, the tread 53 comprises several circumferential ribs, but this appearance does not, of course, have any limiting character. The sidewalls 52 are rounded and occupy the major part of the radial height of the tire 50. The bearing structure comprises a plurality of support elements made up of the composite reinforcements 40 illustrated in the preceding FIG. 3.

The support elements 40 are circumferentially adjacent and each extends substantially radially towards the outside starting from the attachment zone 51. FIG. 4 also shows a principle of this type of non-pneumatic tire according to which it is the flexing of the support elements which makes it possible to bear the load. In this particular example, the tire comprises around one hundred support elements 40. This number may, of course, be very different depending, for example, on the type of vehicle and on the type of use for which it is intended and on the characteristics of the support elements. The number of elements may thus vary, for example, from 30 to 300. Preferably, an interconnecting structure positioned radially under the tread 53, that is relatively rigid in longitudinal traction/compression, circumferentially connects all the support elements 40.

For other details on the composition of these support elements and on the interconnecting structure, the reader could usefully refer to the aforementioned Patent Applications WO 00/37269 and EP 1 359 028.

Such a non-pneumatic tire is capable of equipping any type of motor vehicle, for example of the following types: passenger vehicle, two-wheeled vehicles (especially motorbikes and scooters), planes, industrial vehicles chosen from vans, "heavy goods vehicles" i.e. underground trains, buses, heavy road transport vehicles (lorries, tractors, trailers), off-road vehicles such as agricultural or civil engineering vehicles, and other transport or handling vehicles.

In conclusion, owing to the process of the invention, it is henceforth possible to obtain a composite ring of very high quality by simple unidirectional winding of liquid-state resin layers, this being at a lower cost, while, in particular, avoiding the known drawbacks of the prior processes such as sectioning and assembling prestressed sections, curing in a mould under high pressure, use of long stabilization chambers with several irradiation tubes in series.

The invention claimed is:

1. A process for manufacturing a composite block of closed geometry, in the form of a continuous ring of monolithic structure, based on fibres and on a crosslinkable resin, by continuous winding and superposition of several layers of a tape of reinforcement fibres embedded in a matrix based on a composition comprising a crosslinkable resin, said process comprising, from upstream to downstream, the steps of:
   producing a rectilinear arrangement of reinforcement fibres and conveying this arrangement in a feed direction;
   degassing the arrangement of fibres by the action of a vacuum;
   after degassing, impregnating said arrangement of fibres under vacuum with said resin composition in the liquid state;
   passing the pre-preg thus obtained through a sizing die to make said pre-preg into the form of a tape composed of reinforcement fibres in their liquid resin matrix, the thickness of said tape being less than 0.5 mm;
   depositing the tape onto a support dictating the final shape of the composite block and winding said tape around said support, unidirectionally, by superposition of a predetermined number, denoted by "Nc", of layers of said tape in order to directly form said continuous ring of monolithic structure on said support, Nc being less than 15; and
   once the continuous ring of monolithic structure has thus been formed, subjecting its liquid resin to an at least partial polymerization in order to stabilize said ring before removing it from its support, wherein a tensile stress experienced by the reinforcement fibres in the tape while running between the sizing die and the support is between 0.2 and 5 cN/tex.

2. The process according to claim 1, wherein the reinforcement fibres are chosen from the group composed of glass fibres, carbon fibres and mixtures of such fibres.

3. The process according to claim 1, wherein the resin of the composition is a resin that can be crosslinked by ionizing radiation or by a peroxide.

4. The process according to claim 1, the resin being a polyester or vinyl ester resin.

5. The process according to claim 4, the resin being a vinyl ester resin.

6. The process according to claim 5, the vinyl ester resin being an epoxy vinyl ester resin.

7. The process according to claim 1 the thickness of the tape being between 0.05 and 0.35 mm.

8. The process according to claim 7, the thickness of the tape being between 0.10 and 0.30 mm.

9. The process according to claim 1 the number of layers Nc being less than 10.

10. The process according to claim 9, Nc being between 5 and 10.

11. The process according to claim 1, the thickness of said ring being between 0.5 and 5.0 mm.

12. The process according to claim 11, the thickness of said ring being in a range of 1 to 2 mm.

13. The process according to claim 1, the width of said ring being less than 25 mm.

14. The process according to claim 13, the width of said ring being in a range of 5 to 20 mm.

* * * * *